US008314978B2

(12) United States Patent
Monga et al.

(10) Patent No.: US 8,314,978 B2
(45) Date of Patent: Nov. 20, 2012

(54) HALFTONE INDEPENDENT DEVICE CHARACTERIZATION ACCOUNTING FOR COLORANT INTERACTIONS

(75) Inventors: Vishal Monga, Webster, NY (US); Shen-Ge Wang, Fairport, NY (US); Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 919 days.

(21) Appl. No.: 12/356,897

(22) Filed: Jan. 21, 2009

(65) Prior Publication Data

US 2010/0182649 A1  Jul. 22, 2010

(51) Int. Cl.
H04N 1/46 (2006.01)

(52) U.S. Cl. ......... 358/504; 358/1.9; 358/3.06; 358/518

(58) Field of Classification Search ................... 358/504
See application file for complete search history.

(56) References Cited

U.S. PATENT DOCUMENTS

| | | | |
|---|---|---|---|
| 5,469,267 A | 11/1995 | Wang | |
| 5,748,330 A | 5/1998 | Wang et al. | |
| 5,854,882 A | 12/1998 | Wang | |
| 6,266,157 B1 | 7/2001 | Fan et al. | |
| 6,435,654 B1 * | 8/2002 | Wang et al. | 347/43 |
| 6,851,785 B2 * | 2/2005 | Wu et al. | 347/19 |
| 7,152,941 B2 * | 12/2006 | Johnson | 347/19 |
| 7,411,700 B2 * | 8/2008 | Johnson | 358/1.9 |
| 7,724,406 B2 * | 5/2010 | Wang et al. | 358/504 |
| 7,948,666 B2 * | 5/2011 | Yoshida et al. | 358/518 |
| 2004/0046820 A1 * | 3/2004 | Wu et al. | 347/19 |
| 2006/0256408 A1 * | 11/2006 | Yoshida et al. | 358/518 |
| 2006/0262361 A1 * | 11/2006 | Nakano et al. | 358/504 |
| 2007/0019026 A1 * | 1/2007 | Gibson et al. | 347/19 |
| 2007/0177231 A1 * | 8/2007 | Wang et al. | 358/504 |
| 2008/0055355 A1 * | 3/2008 | Hersch et al. | 347/19 |
| 2010/0067059 A1 * | 3/2010 | Sivan et al. | 358/3.06 |

OTHER PUBLICATIONS

R. Bala, "Device Characterization", *Digital Color Imaging Handbook*, Chapter 5. CRC Press, 2003.
E. J. Neugebauer, "Die theoretischen grundlagen des mahrjarbenbuchdrucks", *Z. Wiss. Photogr.*, pp. 73-89, 1937.
J.A.C. Yule, W.J. Nielsen, "The penetration of light into paper and its effect on halftone reproduction", *Proc. TAGA*, pp. 65-76, 1951.
Wang, Shen-ge, "Two-by-Two Centering Printer Model with Yule-Nielsen Equation", IS&T's NIP 14, International Conference on Digital Printing Technologies, Oct. 1998; p. 302-305; ISBN / ISSN: 0-89208-212-7.

* cited by examiner

*Primary Examiner* — Dung Tran
(74) *Attorney, Agent, or Firm* — Fay Sharpe LLP

(57) ABSTRACT

A model-based halftone independent method for characterizing a printer equipped with a plural of halftone screens comprises: printing a target set of basic patches comprised of a fundamental binary pattern independent of a halftone screen; measuring true color printer response from the target set; modeling a halftone independent characterization of the printer with the mathematical transformation using the measured response; modeling a first halftone dependent characterization of the printer with the mathematical transformer to generate a first predicted result using a selected halftone screen; comparing a measured response of the printer using the halftone screen with the predicted result to define a correction factor corresponding to the halftone screen; and modeling a halftone dependent characterization of the printer using a predicted response of the fundamental binary pattern and the correction factor.

4 Claims, 8 Drawing Sheets

HALFTONE INDEPENDENT DEVICE CHARACTERIZATION ACCOUNTING FOR COLORANT INTERACTIONS

TECHNICAL FIELD

The presently disclosed embodiments are directed to color printing and display systems; and especially color characterization of such systems.

BACKGROUND

In today's business and scientific world, color has become essential as a component of communication. Color facilitates the sharing of knowledge and ideas. Companies involved in the development of digital color print engines are continuously looking for ways to improve the total image quality of their products. One of the elements that affects image quality is the ability to consistently produce the same quality image output on a printer from one day to another, from one week to the next, month after month. Colors on a printer tend to drift over time due to ink/toner variations, temperature fluctuations, type of media used, environment, etc. There has been a long felt commercial need for efficiently maintaining print color predictability, particularly as electronic marketing has placed more importance on the accurate representation of merchandise in illustrative print or display media.

Color printing characterization is a crucial task in color management. The characterization process essentially establishes a relationship between device dependent, e.g. printer CMY, and device independent, e.g. CIELAB values. Several color management tasks such as derivation of ICC profiles, color transforms for calibration, etc. benefit from an accurate mathematical characterization of the physical device. For color printers, characterization is an expensive process involving large numbers of patch measurements and subsequent computation to derive satisfactorily accurate color lookup-tables (LUTs). Further, this process is halftone dependent, i.e. patch printing, measuring and associated computation scales proportionally with the number of halftoning methods. Most high-end color printers are equipped with multiple halftone screens and hence a halftone-independent method for printer characterization is very desirable.

Color printer characterization is the process of deriving a mathematical transform which relates printer CMY(K) to its corresponding device independent representation, e.g. spectral, CIELAB, etc. The forward characterization transform defines the response of the device to a known input, thus describing the color characteristics of the device. The inverse characterization transform compensates for these characteristics and determines the input to the device that is required to obtain a desired response. For the printers hence, a CMY(K) →CIELAB mapping represents a forward characterization transform while the CIELAB→CMY(K) map is an inverse transform. Herein the characterization color transform will be used to refer unambiguously to the forward transform; suitable inversion methods can be used to derive the corresponding inverse transform. The characterization transform is of immense value in many color management tasks such as derivation of ICC profiles for the printer, printer calibration, color control, etc.

The most popular technique to build a printer characterization transform involves printing and measuring a large set of color samples, i.e. CMY(K) patches, in conjunction with mathematical fitting and interpolation to derive CMY(K) →Lab mappings. The accuracy of the characterization transform clearly depends on the number (N) of patches printed and measured. Crucially, note that these patches correspond to contone CMY digital values, i.e. their binary representation is halftone dependent. Hence, deriving characterization transforms for a printer equipped with M halftone screens, requires N*M patches. Even for modest choices of N, M, e.g. N=1000, M=4, this number grows to be unmanageable. Note N cannot be made very small without compromising accuracy. As multiple media are thrown into the mix, the number scales further with the number of distinct media employed, i.e. N×M×P patches are needed where P distinct media types are used.

A halftone independent printer model for calibrating black-and-white and color printers has been previously proposed. This halftone independent printer model is referred to as the two-by-two (2×2) printer model and is described, e.g., in the following U.S. patents, all of which are hereby expressly incorporated by reference into this specification: U.S. Pat. No. 5,469,267, U.S. Pat. No. 5,748,330, U.S. Pat. No. 5,854,882, U.S. Pat. No. 6,266,157 and U.S. Pat. No. 6,435,654. The 2×2 printer model is also described in the following document that is also hereby expressly incorporated by reference into this specification: S. Wang, "Two-by-Two Centering Printer Model with Yule-Nielsen Equation," Proc. IS&T NIP 14, 1998.

The 2×2 printer model is explained briefly with reference to FIGS. 2A, 2B and 2C (note that in FIGS. 2A, 2B, 2C the grid pattern is shown for reference only). FIG. 2A illustrates an ideal example of a halftone printer output pattern IHP, where none of the ink/toner dots ID overlap each other (any halftone pattern can be used and the one shown is a single example only); practical printers are incapable of generating non-overlapping square dots as shown in FIG. 2A. A more realistic dot overlap model is the circular dot model shown in FIG. 2B for the pattern HP (the halftone pattern HP of FIG. 2B corresponds to the halftone pattern IHP of FIG. 2A). These overlapping dots D in combination with optical scattering in the paper medium create many difficulties in modeling a black-and-white printer (or a monochromatic channel of a color printer). In a conventional approach such as shown in FIG. 2B, the output pixel locations are defined by the rectangular spaces L of the conceptual grid pattern G and are deemed to have centers coincident with the centers of the dots output D (or not output) by the printer. Because the grid G is conceptual only, according to the 2×2 printer model, the grid G can be shifted as shown in FIG. 2C and indicated at G' so that the printer output dots D' of the pattern HP' are centered at a cross-point of the grid G' rather than in the spaces L'. Although the halftone dot patterns HP,HP' of FIGS. 2B and 2C are identical, overlapping details within the rectangular spaces L' of the grid of FIG. 2C are completely different as compared to FIG. 2B. More particularly, there are only $2^4=16$ different overlapping dot patterns for the 2×2 model shown in FIG. 2C, while there are $2^9=512$ different overlapping dot patterns in a conventional circular dot model as shown in FIG. 2B.

The sixteen different overlapping dot patterns of FIG. 2C can be grouped into seven categories G0-G6 as shown in FIG. 2D, i.e., each of the 16 possible different overlapping dot patterns of a pixel location L' associated with the model of FIG. 2C can be represented by one of the seven patterns G0-G6 of FIG. 2D. The patterns G0 and G6 represent solid white and solid black (or other monochrome color), respectively. The pattern G1 is one of four different equivalent overlapping patterns that are mirror image of each other, as is the pattern G5. Each of the patterns G2, G3, G4 represents one of two different mirror-image overlapping patterns. Therefore, in terms of ink/toner color coverage (gray level), all pixels (located in the rectangular spaces L' of the conceptual grid pattern G) of each of the seven patterns G0-G6 are identical within a particular pattern G0-G6. In other words, each pattern G0-G6 consists of only one gray level at the pixel level L', and this gray level can be measured exactly.

The test patches G0'-G6' shown in FIG. 2E illustrate an example of one possible real-world embodiment for printing the seven patterns G0-G6. The present development is described herein with reference to printing and measuring the color of the test patches G0'-G6', and those of ordinary skill in the art will recognize that this is intended to encompass printing and measuring the color of any other test patches that respectively represent the patterns G0-G6 in order to satisfy the 2×2 printer model as described herein. It is not intended that the present development, as disclosed below, be limited to use of the particular test patches G0'-G6' or any other embodiment of the 2×2 patterns G0-G6. In general, for the 2×2 printer model to hold, the shape of the dots D' must be symmetric in the x (width) and y (height) directions, and each dot D' should be no larger than the size of two output pixel locations L' in both the x and y directions. The dots D' need not be circular as shown.

The 2×2 printer model as just described can be used to predict the gray level of any binary (halftone) pattern, because any binary pattern such as the halftone pattern of FIG. 2C can be modeled as a combination of the seven patterns G0-G6, each of which has a measurable gray level as just described. In other words, once the seven test patches G0'-G6' are printed and the gray (color) level of each is measured, the gray level of any binary pattern can be predicted mathematically and without any additional color measurements. For example, the halftone pattern of FIG. 2C is shown in FIG. 3, along with its corresponding 2×2 based model M, wherein each of the output pixels of the halftone pattern HP' (conceptually located in a rectangular space L' of the grid) is represented by one of the seven 2×2 patterns G0-G6 that has a corresponding color output pattern/coverage for its pixels. Thus, for example, for the pixel $P_{00}$ of the binary pattern HP', the 2×2 pattern G1 has pixels with corresponding color coverage (as indicated at $P_{00}$'), while for the pixel $P_{50}$, the 2×2 pattern G3 has pixels with corresponding color coverage as shown at $P_{50}$', and for the pixel $P_{66}$ there is no color which corresponds to the pattern G0 as indicated at $P_{66}$' of the model M. As such, any binary pattern of pixels can be modeled as a combination of the 2×2 patterns G0-G6 by selecting, for each pixel of the binary pattern, the one of the 2×2 patterns G0-G6 that is defined by pixels having color coverage the equals the color coverage of the pixel in question.

When a binary pattern HP' is represented by a model M comprising a plurality of the patterns G0-G6, the gray level output of the binary pattern HP' can be estimated mathematically, e.g., using the Neugebauer equation with the Yule-Nielsen modification, as follows:

$$G_{AVG}^{1/\gamma} = \sum_{i=0}^{6} n_i G_i^{1/\gamma} \qquad (1)$$

where $G_i$, i=0 to 6 is the measured gray level of the respective 2×2 patterns G0-G6, $n_i$ is the number of pixels of the corresponding 2×2 pattern in the binary pattern, and y is the Yule-Nielsen factor, a parameter which is often chosen to optimize the fit of the model to selected measurements of halftone patches. Details of such an optimization are given in R. Bala, "Device Characterization," Digital Color Imaging Handbook, Chapter 5, CRC Press, 2003. For example, the average gray level of the binary pattern of FIG. 2B/FIG. 2C can be estimated as:

$$G_{AVG} = (7G_0^{1/\gamma} + 25G1^{1/\gamma} + 7G_2^{1/\gamma} + 3G_3^{1/\gamma} + 3G_4^{1/\gamma} + 3G_5^{1/\gamma} + G_6^{1/\gamma})^{\gamma} \qquad (2)$$

The color 2×2 printer model can be described in a similar manner. The color 2×2 printer model can predict the color appearance of binary patterns for a given color printer and the color accuracy of the prediction is high for printers with relatively uniform dot shapes, such as inkjet printers. However, xerographic printers usually do not generate uniform round-shape dots for isolated single pixels and the dot overlapping is more complicated as compared to inkjet dot output. As such, the color 2×2 printer model applied to a xerographic printer will typically yield larger prediction errors.

The 2×2 printer model predicts output color at the pixel level. To estimate the average color of a large area by a binary color printer, one may use modified Neugebauer equations. For the following discussion, colors are specified in spectral reflectance, though they could be in tristimulus values XYZ or another appropriate space as well. The predicted color reflectance R (λ) of an output by a binary printer (accounting for light scattering in the paper) is given by $$R(\lambda)^{1/n} = \sum_{i=1}^{n} a_i R_i(\lambda)^{1/n} \qquad (3)$$

where $a_i$ and $R_i(\lambda)$ are the area coverage and the spectral-reflectance of each primary color, N is the total number of primary colors, and n is the Yule-Nielsen factor.

The difficulty in applications of Neugebauer equations with conventional printer models is to accurately estimate the area coverage of primaries, mainly due to the complexity of dot overlapping. However, this difficulty is completely eliminated by the 2×2 printer model. The modified Neugebauer equation, shown by Equation (2), can be directly applied to the 2×2 printer model for predicting average colors of any dot combinations. As the case stands, $R_i(\lambda)$ in Equation (3) represents the measured spectral reflectance of each 2×2 color. The area coverage $a_i$ of each 2×2 color is directly proportional to its occurrence $m_i$ in number of pixels, and can be calculated by the following equation $$a_i = m_i \bigg/ \sum_{j=1}^{N} m_j \qquad (4)$$

There is thus a need for a printer characterization system that is halftone screen independent wherein all halftones characterizations may be obtained by printing and measuring this fundamental binary patch target, i.e. no repeated halftone dependent patch measurements are needed. Such a methodology would allow construction of more accurate printer characterization transforms without incurring an increase in measurement cost.

SUMMARY

According to aspects illustrated herein, there is provided a model-based, halftone independent method for characterizing a printer equipped with a plurality of halftone screens, comprising: printing a target set of basic patches with the printer comprised of a fundamental binary pattern independent of a halftoning method; measuring printer response from the target set; modeling a halftone independent characterization of the printer with the fundamental binary pattern; calculating a halftone screen correction factor from a measured response of halftone screen to a device color value and a predicted response of the fundamental binary pattern to the device color value; and modeling a halftone dependent characterization of the printer using the screen correction factor.

According to aspects illustrated herein, there is provided a halftone independent method for device characterization comprising: calculating an online binary printer model which is halftone independent, retrieving one of a set of user-selected halftones and a corresponding halftone correction factor, processing a device color value through the selected halftone, the online binary printer model and the corresponding halftone correction factor to produce a corresponding colorimetric value; and, using a plurality of device color values and corresponding calorimetric values to product a printer characterization for the user selected halftone. The halftone correction factor is derived in an offline step as a mathematical transformation between true color values as measured from the device and those predicted via a printer model.

According to aspects illustrated herein, there is provided a halftone independent method for device characterization comprising: deriving an offline binary printer model which is halftone independent; generating an offline halftone correction factor for each of a set of user-selected halftones; calculating an online binary printer model which is halftone independent; retrieving one of the set of user-selected halftones and a corresponding offline halftone correction factor; processing a device color value through the selected halftone, the online binary printer model and the offline halftone correction factor to produce calorimetric values; and using the device color values and calorimetric values to produce a halftone dependent printer characterization for user-selected halftones.

DETAILED DESCRIPTION

Figure 1:
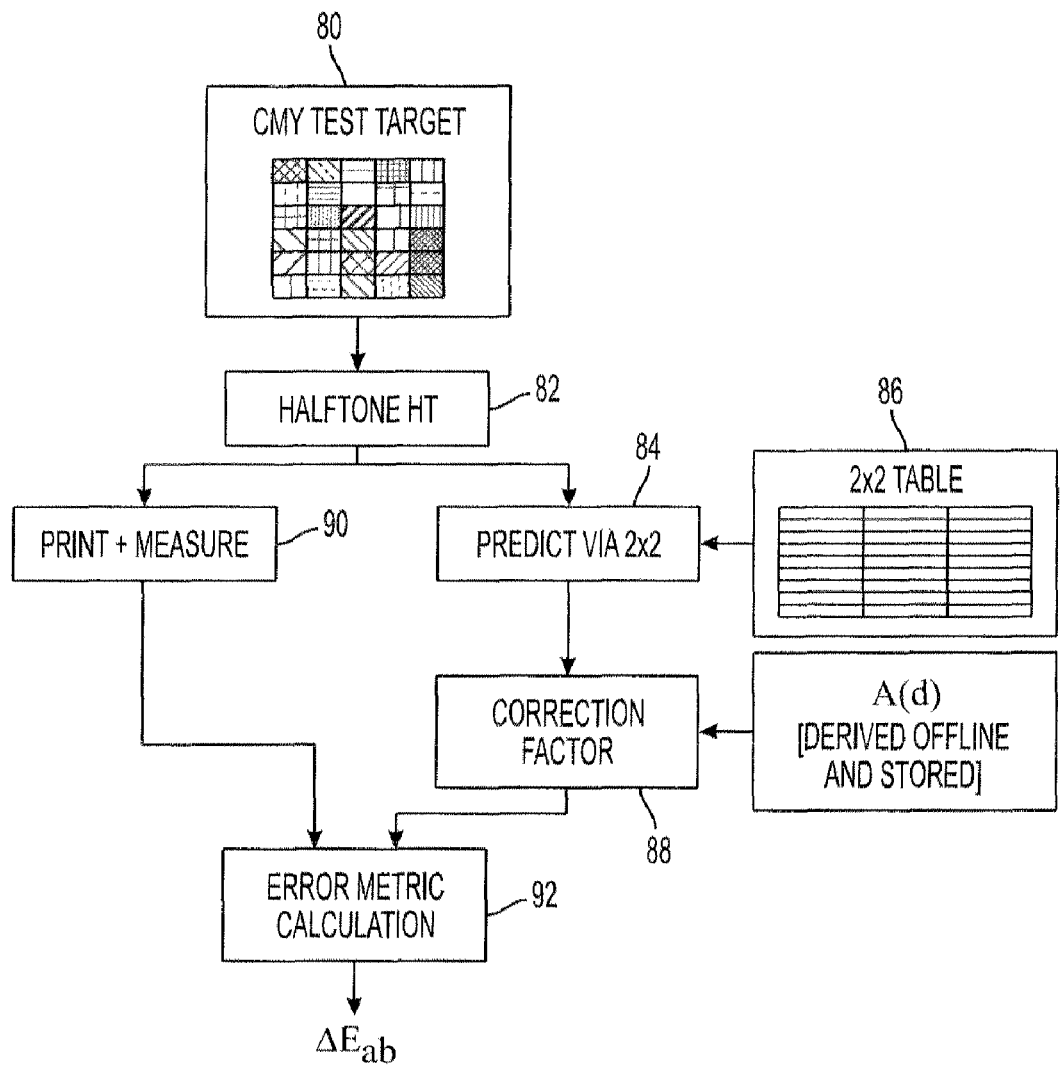
FIG. 1 graphically illustrates a method/block diagram for halftone independent characterization accounting for color interaction.
Figure 2A:
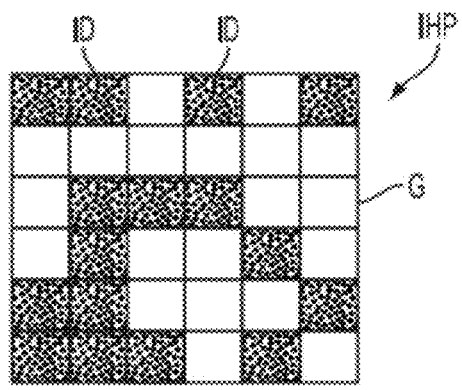
FIG. 2A illustrates an ideal non-overlapping printer model for halftone patterns.
Figure 2B:
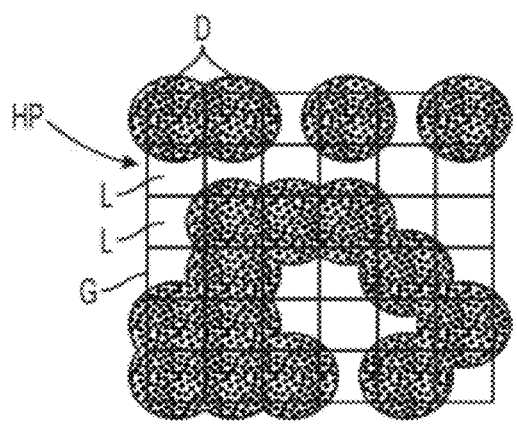
FIG. 2B illustrates a conventional overlapping circular dot printer model for halftone patterns.
Figure 2C:
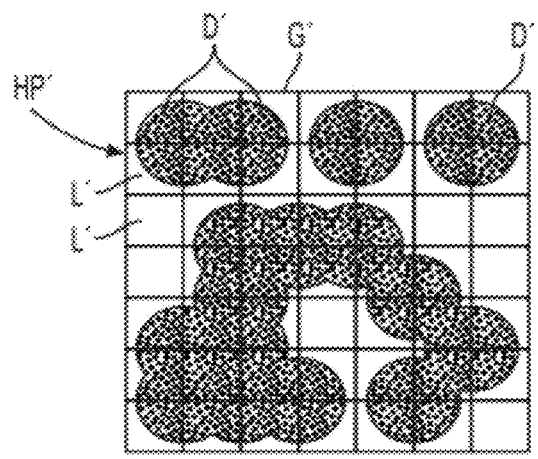
FIG. 2C illustrates a 2×2 printer model for halftone patterns.
Figure 2D:
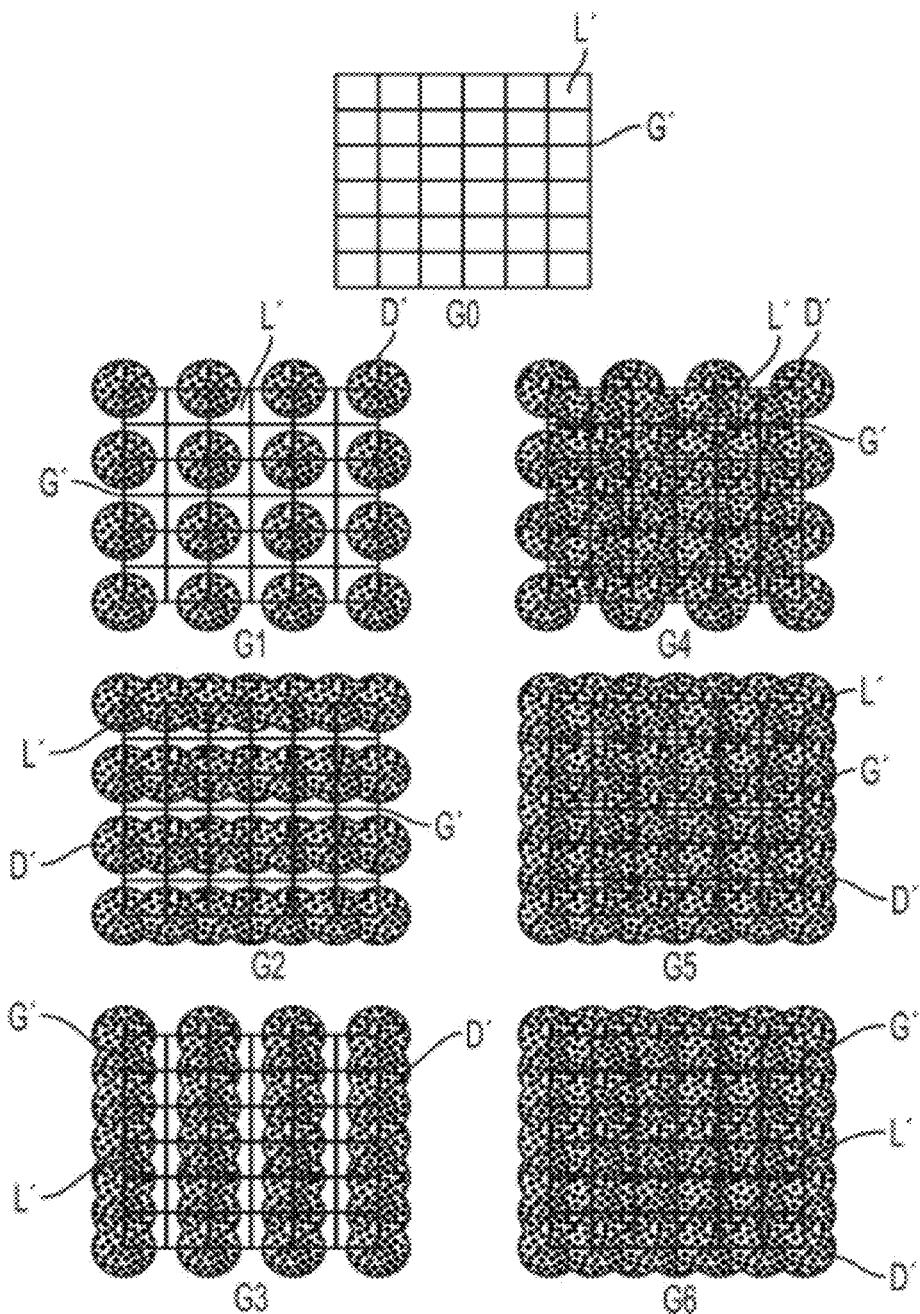
FIG. 2D illustrates seven 2×2 patterns that account for all of the sixteen possible overlapping printer output dots in the 2×2 printer model.
Figure 2E:
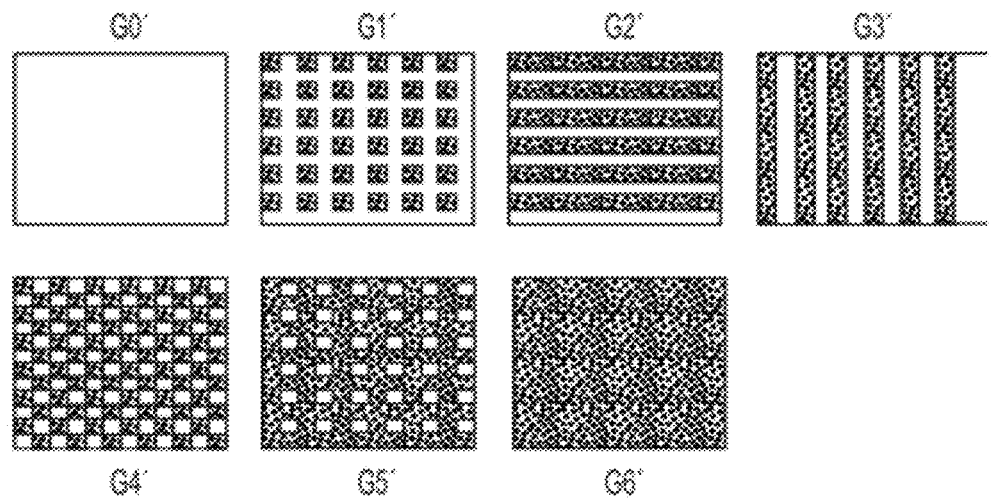
FIG. 2E illustrates one example of real-world representations or "test patches" for the seven 2×2 patterns of FIG. 2D.
Figure 3:
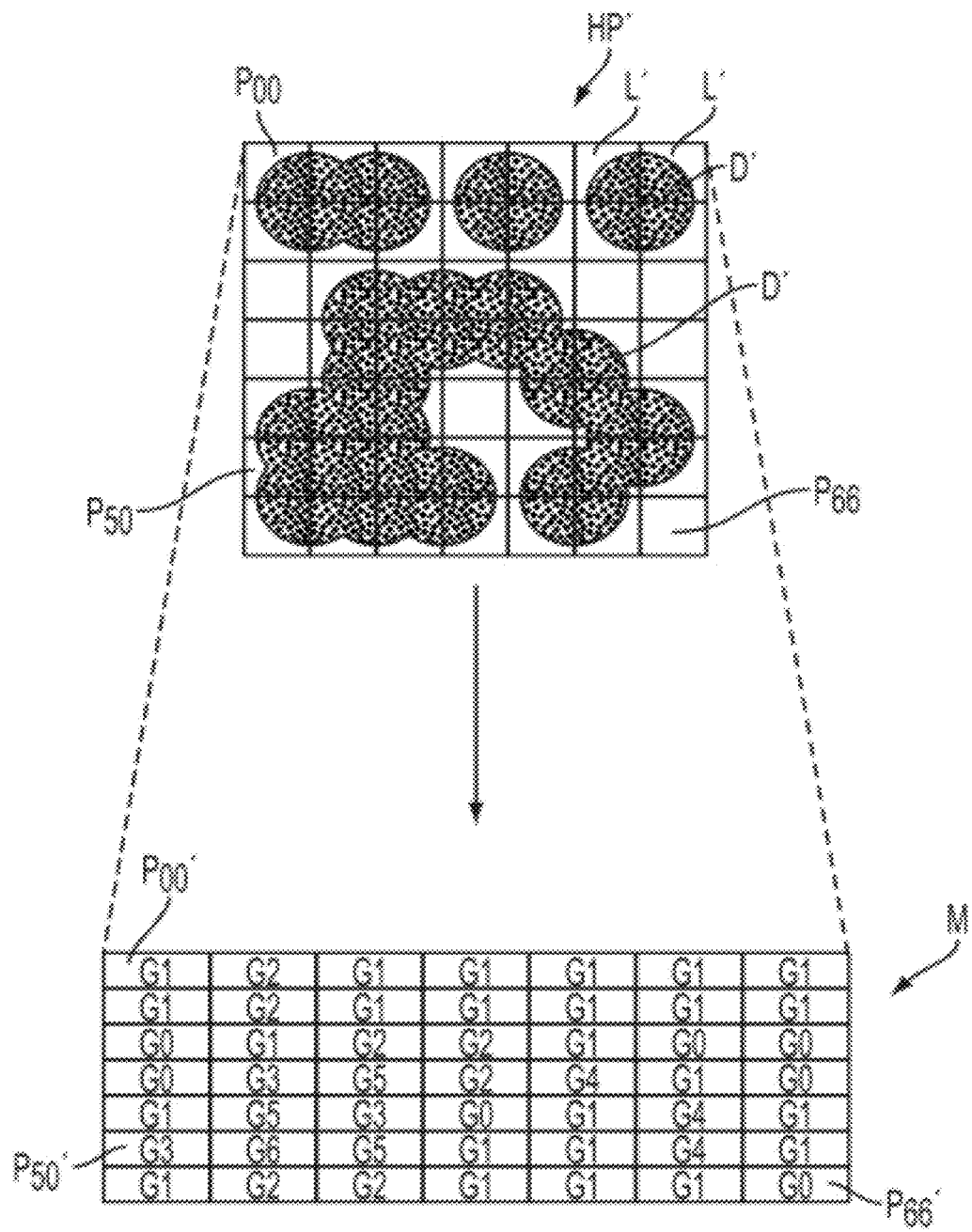
FIG. 3 illustrates an example of modeling a binary (halftone) pattern using a select plurality of the seven 2×2 patterns of FIG. 2D.

The present embodiments comprise methods for halftone independent color printer characterization. A target set of fundamental binary patterns based on the 2×2 binary printer model is printed. Because the patches in the target set are not tied to any halftoning method, the effort in characterization does not scale as more halftoning methods are added in the printing system. In other words, the present embodiments include two stages: (1) an offline step that establishes a mathematical transformation between the color responses predicted by the 2×2 printer model and the true measured printer response for a given printing device CMY(K) color (this transform will herein be referred to as the "correction factor") and (2) the online step where a plurality of fundamental binary patches (e.g., 1,072) are printed and measured, a color prediction via the 2×2 printer models made and refined using the correction factor derived in the offline step.

In addition to enhanced capability across halftones, the subject embodiments provide the benefit of constructing a more accurate printer characterization transforms without incurring an increase in measurement cost. This is so because the measurement effort in the online step is always constant (i.e., the 1,072 2×2 binary patterns); and, thus, only the offline step (i.e., derivation of the correction factor) need be burdened to increase the accuracy of the color transform.

A fundamental mathematical principle applicable to the present embodiments is that over time, for a given halftoning algorithm, the 2×2 predicted response deviates from the true printer response in an invariant manner.

Mathematically, this may be described as $$y'(d)=f(x'(d)) \quad (5)$$

y'(d)—the measured Lab vector corresponding to the digital value vector d x'(d)—the 2×2 predicted Lab vector corresponding to the digital value vector d where d represents the vector of CMY digital values, e.g. d=[0 128 128]=>C=0, M=128, Y=128, t represents the time at which the patches were printed and measured.

The method described herein assumes the characterization transform goes from digital value d to the CIELAB space, i.e. x(d), y(d) are CIELAB values. However, the proposed approach can be applied even as x(d), y(d) belong to alternate color spaces, e.g. spectral, scanner RGB, etc. Considering that Equation (2) predicts color spectra; spectral or wavelength may be the more natural space for this modeling. However, for ease of exposition and because CIELAB is very common in color management tasks, modeling is only discussed in reference to CIELAB. It should be noted that $f$ then implicitly accounts for the non-linearity in the transformation from spectral to Lab.

The crucial assumption in Equation (5) is that the functional mapping from the 2×2 predicted response does not depend on time. Physically, such a modeling is motivated by the fact that the difference between the 2×2 printer model and the true measured response is attributed to the geometric assumptions made by the model. It is reasonable then to assume that the differences in the dot overlap geometry assumed by 2×2 vs the true dot overlap geometry should on average be the same irrespective of time, i.e. in particular the relationship between the 2×2 and true response should be mathematically invariant across time.

This assumption was experimentally verified in previous work S. Wang, et al., U.S. Published Patent Application No. US2007/0177231-A1, for the color response of a single colorant printer. In particular, for colorant i, i=C,M,Y the following relationship held true:

$$\frac{R_{true}(t_1, i, H)}{R_{2\times 2}(t_1, i, H)} = \frac{R_{true}(t_2, i, H)}{R_{2\times 2}(t_2, i, H)} \quad (6)$$

where $R_{true}(t,i,H)$=true/measured response of $i^{th}$ colorant at time t in deltaE from paper $R_{2\times 2}(t,i,H)$=2×2 predicted response of $i^{th}$ colorant at time t in deltaE from paper and H represents the halftoning method used, i=C, M, Y, K This amounts to saying that given the knowledge of the 2×2 and true/measured printer response at a default or reference printer state $t_1$ the true response can be estimated at a drifted state $t_2$ as $$\hat{R}_{true}(t_2, i, H) = \frac{R_{true}(t_1, i, H)}{R_{2\times2}(t_1, i, H)} R_{2\times2}(t_2, i, H) \quad (7)$$

Alternatively, the above may be rewritten as (the notational dependence on i, H are dropped as they are clear by context)

$$\hat{R}_{true}(t_2,d) = a(d) R_{2\times2}(t_2,d) \quad (8)$$

Here, a(d) denotes the time-invariant "halftone correction factor".

Note that Equation (8) is similar to Equation (5) in that it is a particular instantiation of the time invariant function $f$. The crucial difference is that the color responses $R_{true}(t,i,H)$, $R_{2\times2}(t,i,H)$ are one-dimensional; likewise d in [0,255] is an integer scalar whereas color responses x(d) and y(d) are 3-dimensional.

The invariance modeling of Equation (8) can be extended to multiple dimensions as $$y'(d) = A(d) \cdot x'(d) \quad (9)$$

i.e. the 3×3 matrix A(d) forms a new time-invariant "correction factor". In the preferred embodiment, this matrix is derived in an offline step as follows. Several pairings are generated {xi, yi}, i=1, 2, . . . T by obtaining both the 2×2 printed color and the true measured color corresponding to digital value triplets {$d_i$}, i=1, 2, . . . , T. Then the optimal "correction factor" for each d is given by $$A^{opt}(d) = \mathrm{argmin}\left[\frac{1}{T} \sum_{i=1}^{T} \|y_i - A(d) x_i\|^2 \cdot w(d - d_i)\right] \quad (10)$$

where w( ) is inversely proportional to the Euclidean distance $\|d-d_i\|$, so greater importance is attached to $d_i$'2 that are closer to d.

Figure 4:
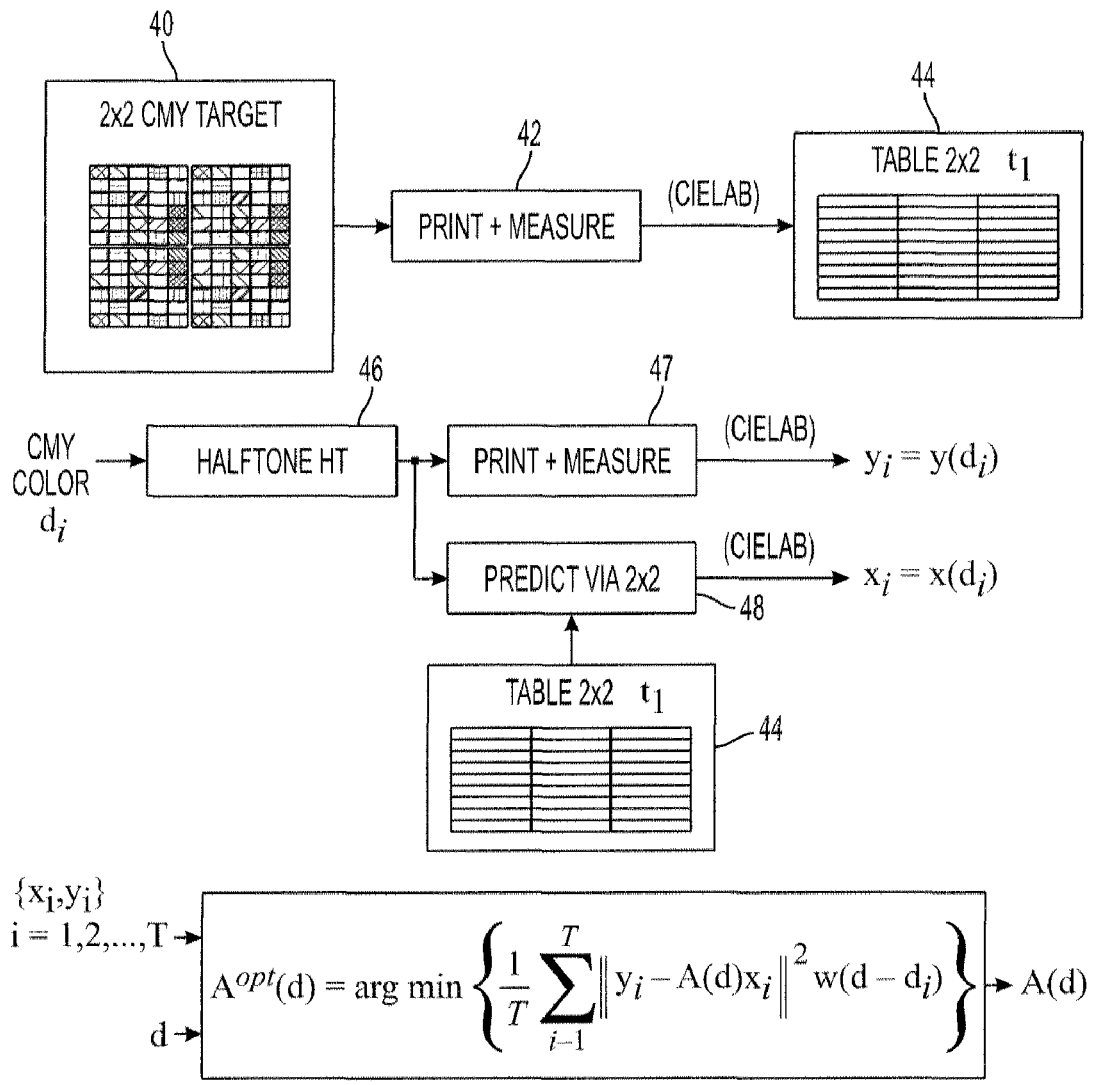
FIG. 4 is a block diagram illustrating construction of matrices $A_d$ which comprise a halftone correction factor for a given halftoning method at a referenced date t1.

FIG. 4 summarizes one embodiment for the offline constructing the matrices A(d) which comprise the "correction factor" for a given halftoning method which need only be done once at a time $t_0$. Note that the accuracy of the printer-model may be controlled via the number of patch measurements T which may be experimentally chosen large enough to obtain satisfactory accuracy.

A plurality of CMY test targets 40 are printed and measured 42 to identify the printing devices true response (CIELAB) which is identified in lookup table 2×2 $t_1$ 44. A particular halftone screen 46 is selected for a particular CMY color that is printed and measured 47 through the printing device to give a true printing response $y_i$. The same color as generated by the same halftone screen 46 is also modeled 48 through a predicting transform determined from the 2×2 CMY target patches 40 to give a predicted color response $x_i$. Equation 10 is then applied to determine the correction factor A(d). The correction factor $A_d$ can be obtained for each halftone screen 46 employed in the printing device, and it is envisioned that there will be several.

Figure 5:
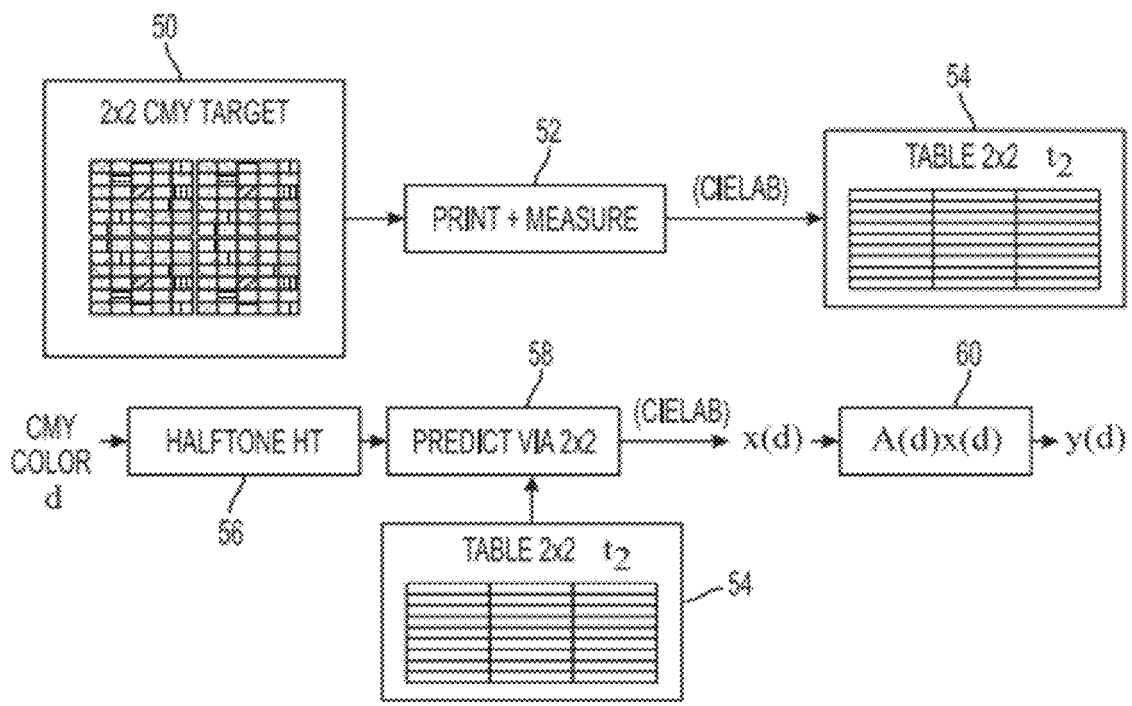
FIG. 5 is a schematic diagram of the subject process for halftone independent characterization.

The online step illustrated in FIG. 5 is much simpler and involves printing and measuring only the 2×2 binary patches. The "correction factor" as derived in the offline step is used to obtain an estimate of the true response. More particularly, patches 50 are printed and measured 52 to obtain a true response CIELAB as defined by Table 2×2 $t_2$ 54. Then a particular CMY color d is printed using a selected halftone screen 56 is predicted by using the 2×2 model 58 table 54 but then is adjusted by a correction factor 60 associated with particular halftone screen 56 to obtain an estimate of the true response $\hat{y}(d)$.

Figure 6:
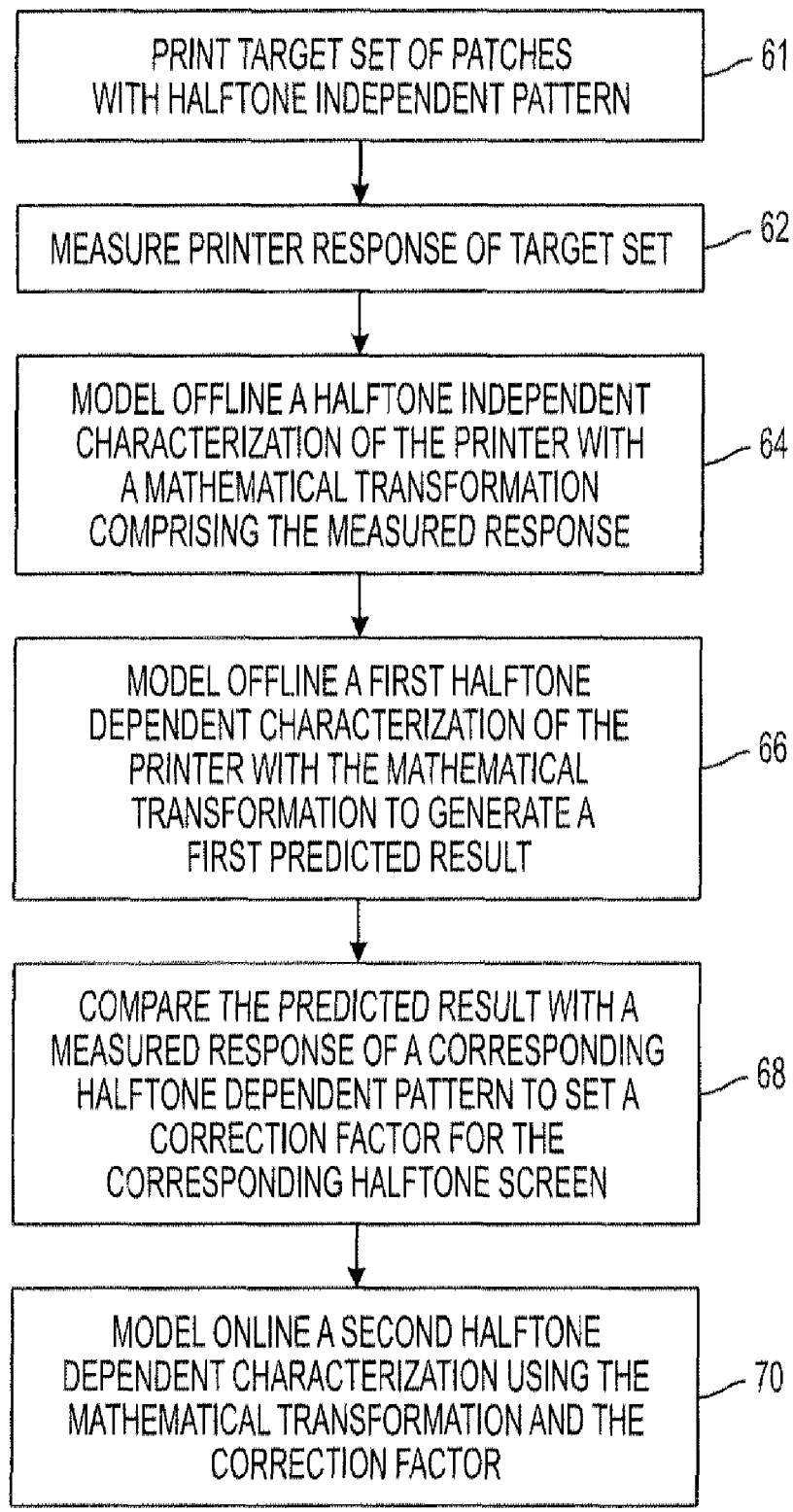
FIG. 6 is a flowchart illustrating an embodiment.

The foregoing steps are illustrated in the flowchart of FIG. 6, wherein the targets of the patches are printed with the halftone independent pattern 60 and then measured 62 to identify the printer response to the target separate measurement is accomplished by conventional sense for a spectral photometric devices (not shown). A halftone independent characterization of the device can then be modeled offline 64 with a medical transformation comprising the measured response (i.e., in blocks 44, 48 of FIG. 4). By "offline" is meant that the characterizing process is performed other than when the printer is performing a user/customer specified task in an ordinary work environment. "Online" is such a customer environment. A halftone screen dependent characterization is then modeled 66 with the mathematical transformation to generate our first predicted result (the predicted result is determined from the halftone independent characterization). The predicted result is compared 68 with a true color measured response to set a correction factor for the employed halftone screen print. A second halftone dependent characterization of the printer can then be modeled 70 using the mathematical transformation and the correction factor (blocks 54, 58, 60 of FIG. 5). The same correction factor is thus applied to a plurality of different halftone screens to avoid having to measure the printer response and generate a corresponding LUT with an undesired plurality of patches.

With reference to FIG. 1, it can be seen that a particular printer device can be characterized with a reduced number of CMY test target color values 80 for a particular halftone screen pattern 82 by using the aforementioned model determined offline with the fundamental binary pattern that is halftone independent 84, 86 and the correction factor A(d) that had been previously derived offline and then stored for correspondence to the selected halftone screen 82. The true color values of the printing device are measured and in error metric calculation $\Delta E_{ab}$ 92 is calculated for use in the transform for characterizing online printer operations. Again, it is important to note that only a reduced number of color patches are required for characterizing a printer having a plurality of halftone screens since each halftone screen is already associated with the derived offline and stored correction factor so that a reliable error metric calculation can be accomplished.

The word "printer" as used herein encompasses any apparatus, such as a digital copier, bookmaking machine, facsimile machine, multi-function machine. etc. which performs a print outputting function for any purpose It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A model-based, halftone independent method for characterizing a printer equipped with a plurality of halftone screens, comprising a static offline step and a dynamic online step, where the offline step includes:
   at reference time $t_0$, printing a target set of color patches where the patches are halftone independent colorant overlap patterns and that each colorant assumes only values from a binary set,
   measuring the target of patches using a spectral measurement device;
   deriving a multi-color binary printer model of multiple color channels using said measurements;
   obtaining a predicted printer response for a given color halftone screen based on the said multi-color binary printer model;
   comparing a true measured response of the printer using the halftone screen with the predicted response to derive a correction factor corresponding to the halftone screen such that the correction factor maps the said predicted response to the true measured response including an accounting of colorant interactions;

and the dynamic online step comprising at any time $t_n$:

printing a target set of color patches where the patches are colorant overlap patterns wherein each colorant assumes only values from a binary set;

measuring the said target of patches using a spectral measurement device;

deriving a binary printer model using said measurements;

obtaining a multi-color predicted printer response for a given color halftone screen based on the said binary printer model; and applying the correction factor obtained in the said offline step to the said multi-color predicted printer response to obtain an estimate of a true printer response including an accounting of colorant interactions.

2. The method of claim 1 wherein the printing the target set comprises printing 2×2 spatial dot arrangements.

3. The method of claim 1 wherein the modeling of the halftone independent characterization is temporally invariant.

4. The method of claim 1 wherein the printer model is a halftone independent characterization binary printer model parameterized by a table of values generated by printing and measuring canonical binary patterns which are halftone independent.

* * * * *